(12) United States Patent
Abiko et al.

(10) Patent No.: US 6,551,680 B2
(45) Date of Patent: Apr. 22, 2003

(54) OPTICAL RECORDING MEDIUM

(75) Inventors: Toru Abiko, Miyagi (JP); Fuminori Takase, Miyagi (JP); Hitoshi Shimomuki, Miyagi (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 09/822,556

(22) Filed: Mar. 30, 2001

(65) Prior Publication Data

US 2001/0036527 A1 Nov. 1, 2001

(30) Foreign Application Priority Data

Mar. 31, 2000 (JP) .................................... 2000-097568
Sep. 28, 2000 (JP) .................................... 2000-296187

(51) Int. Cl.$^7$ ............................................... B32B 3/02
(52) U.S. Cl. .................... 428/64.1; 428/64.5; 428/64.6; 430/270.13
(58) Field of Search ............................ 428/64.1, 64.4, 428/64.5, 64.6, 457, 913; 430/270.13, 495.1, 945; 369/275.1, 283, 288

(56) References Cited

U.S. PATENT DOCUMENTS 6,228,457 B1 * 5/2001 Ueno .......................... 428/64.1

2001/0015949 A1 * 8/2001 Nagase ........................ 369/100

* cited by examiner

Primary Examiner—Elizabeth Mulvaney
(74) Attorney, Agent, or Firm—Sonnenschein, Nath & Rosenthal

(57) ABSTRACT

In order to ensure CAV recording/reproduction while preventing jitter deterioration and modulation decrease and thereby ensuring sufficient recording properties, even at a linear velocity higher than 4.8 m/s, a first dielectric film, phase change versatile recording film, second dielectric film, reflection film and protective film are formed on a disc substrate having formed lands and grooves on one major surface. The recording film is made of a GeInSbTe alloy, and the reflection film is made of an AgPdCu alloy or AlCu alloy. Composition of the GeInSbTe alloy is adjusted to contain Ge in the range of 1 to 6 wt %, In in the range of 2 to 6 wt %, and control Sb/Te in the range of 2.2 to 3.0. Composition of the AgPdCu alloy is adjusted to contain Cu not more than 1.5 wt %. Regarding groove conditions, groove depth is controlled in the range of 40 to 50 nm, groove width in the range of 0.40 to 0.65 μm, thickness of the first dielectric film in the range of 75 to 95 nm, thickness of the recording film in the range of 12 to 18 nm, thickness of the second dielectric film in the range of 20 to 28 nm, and thickness of the reflection film in the range of 60 to 140 nm.

12 Claims, 5 Drawing Sheets

OPTICAL RECORDING MEDIUM

BACKGROUND OF THE INVENTION

1. Field of the Invention

This invention relates to an optical recording medium especially suitable for application to a phase change versatile optical disc available for repetitive recording and erasure.

2. Description of the Related Art

In recent data recording technologies, researches are being developed regarding optical recording systems. Optical recording systems can record and reproduce information signals without contacting a recording medium, and can attain higher recording densities as ten times or more as that those of magnetic recording systems. Additionally, optical recording systems have a number of advantages, including the availability for use with any type of memory such as reproduction-exclusive type, additional recording type and rewritable type. Thus, the optical recording systems are expected to be widely usable in industrial purposes and home-base purposes as a recording system that enables realization of inexpensive, large-capacity files.

Among those optical recording systems, optical magnetic discs and phase change versatile optical discs, for example, cope with rewritable memory modes. Optical magnetic discs are configured to locally heat a recording film made of a magnetic material to or above a Curie point or a temperature compensation point, thereby to decrease the coercive force of the recording medium, then apply an external recording magnetic field, thereby to change the magnetic orientation of the recording medium, and record information signals, or magnetically read out information signals. On the other hand, phase change versatile optical discs includes a recording film made of a phase change versatile material in which changes between a crystalline state and an amorphous state reversibly occur, and are configured to heat the recording film by irradiation of laser light, for example, thereby cause a change in phase in the recording film to record/erase information, or optically read out information signals.

As a conventional phase change versatile disc, CD-RW (Compact Disc-ReWritable) is known and being widely spread. The format of CD-RW is shown below.

Wavelength of light: 780 nm

Numerical aperture of the optical system lens:

| For recording/erasure | NA = 0.50 |
|---|---|
| For reproduction | NA = 0.45 |

Capacity: 650 MB

Track pitch: 1.6 $\mu$m

Reflectance: 15 through 25%

Modulation: 55 through 70%

Resolution: 45 through 60%

Linear velocity: 1.2 through 4.8 m/s (equal to four-times velocity)

Repeatable recording frequency: 1000 times or more.

In order to realize such a phase change versatile optical disc under that regulation (specifically, CD-RW), AgInSbTe-series materials are used as phase change versatile materials, and Al—Ti alloys and Al—Cr alloys are used as materials of reflecting films.

The conventional phase change versatile discs improvement in recording speed and reproducing speed are demanded. When an improvement of the linear velocity is tried toward realization of high-speed recording and high-speed reproduction, the following problem will occur. That is, recording or reproduction of information signals at a higher linear velocity than the conventional maximum linear velocity (linear velocity of about 4.8m/s (four-times velocity)) will invite deterioration of jitters and decrease of the modulation. Therefore, practically acceptable recording characteristics could not be obtained.

SUMMARY AND OBJECT OF THE INVENTION

It is therefore an object of the invention to provide an optical recording medium capable of preventing deterioration of jitters and a decrease of the modulation even at a linear velocity higher than 4.8 m/s, and thereby ensuring practically acceptable recording characteristics.

According to the first aspect of the invention, there is provided an optical recording medium comprising:

a substrate having ridge-and-furrow groove tracks on one major surface thereof; and a first dielectric film, phase change versatile recording film, second dielectric film and reflection film that are sequentially stacked on the one major surface of the substrate, the phase change versatile recording film being made of a GeInSbTe alloy material, and the reflection film being made of an AgPdCu alloy material, in the GeInSbTe alloy material forming the phase change versatile recording film, content of Ge being in the range from 1 weight % to 6 weight %, content of In being in the range from 2 weight % to 6 weight %, and ratio of Sb relative to Te being in the range of 2.2 times to 3.0 times, and in the AgPdCu alloy material forming the reflection film, content of Pd being in the range of 0.9 weight % to 1.5 weight %, and content of Cu being in the range of 0.9 weight % to 1.1 weight %, depth of the furrow on the groove tracks being in the range from 40 nm to 50 nm, and distance between two adjacent boundaries at opposite sides of the furrow being in the range of 0.40 $\mu$m to 0.65 $\mu$m, thickness of the first dielectric film being in the range of 75 nm to 95 nm, thickness of the phase change versatile recording film being in the range of 12 nm to 18 nm, thickness of the second dielectric film being in the range of 20 nm to 28 nm, and thickness of the reflection film being in the range of 60 nm to 140 nm.

According to the second aspect of the invention, there is provided an optical recording medium comprising:

a substrate having ridge-and-furrow groove tracks on one major surface thereof; and a first dielectric film, phase change versatile recording film, second dielectric film and reflection film that are sequentially stacked on the major surface of the substrate, the phase change versatile recording film being made of a GeInSbTe alloy material, and the reflection film being made of an AlCu alloy material, in the GeInSbTe alloy material forming the phase change versatile recording film, content of Ge being in the range from 1 weight % to 6 weight %, content of In being in the range from 2 weight % to 6 weight %, and ratio of Sb relative to Te being in the range of 2.2 times to 3.0 times, and in the AlCu alloy material forming the reflection film, content of Cu being not more than 1.5 weight %, depth of the furrow on the groove tracks being in the range from 40 nm to 50 nm, and distance between two adjacent boundaries at opposite sides of the furrow being in the range of 0.40 µm to 0.65 µm, thickness of the first dielectric film being in the range of 75 nm to 95 nm, thickness of the phase change versatile recording film being in the range of 12 nm to 18 nm, thickness of the second dielectric film being in the range of 20 nm to 28 nm, and thickness of the reflection film being in the range of 60 nm to 140 nm.

In the present invention, wavelength of light irradiated onto the phase change versatile recording film of the optical recording medium upon recording or erasing information signal on or from the optical recording medium is typically selected from the range of 775 nm to 795 nm, approximately, and more specifically, it is about 780 nm, for example.

In the present invention, numerical aperture of the lens in the optical system used upon recording or erasing information signals on or from the optical recording medium is typically in the range from 0.49 to 0.51, and numerical aperture of the lens in the optical system used upon reproducing information signals is typically in the range from 0.44 to 0.46. More specifically, numerical aperture of the lens in the optical system used upon recording or erasing information signals on or from the optical recording medium is approximately 0.5, and numerical aperture of the lens in the optical system used upon reproducing information signals is approximately 0.45.

In the present invention, the recording linear density in the optical recording medium is typically 0.59 µm per bit.

In the present invention, ratio of Sb relative to Te in the GeInSbTe alloy material forming the phase change versatile recording film is preferably 2.2 times to 2.8 times.

In the present invention, width between two adjacent boundaries at opposite sides of a furrow is preferably in the range from 0.52 µm to 0.65 µm.

In the present invention, the first dielectric film is made of a material with a low absorptance to laser light of the optical system used upon recording/reproduction to the optical recording medium. Preferably, a material having a value of extinction coefficient k not higher than 0.3 is used as the material of the first dielectric film.

In the present invention, the second dielectric film is made of a material with a low absorptance to laser light of the optical system used upon recording/reproduction of the optical recording medium. Preferably, a material having a value of extinction coefficient k not higher than 0.3 is used as the material of the first dielectric film.

In the present invention, the optical recording medium is a rewritable optical recording medium using a phase change versatile material as the recording film. Specifically, it may be CD-RW (Compact Disc ReWritable).

According to the optical recording medium having the above-summarized configuration according to the invention, the phase change versatile recording film in the optical recording medium is made of a GeInSbTe alloy material; the reflection film is made of an AgPdCu alloy material or AlCu alloy material; the GeInSbTe alloy material forming the phase change versatile recording film contains Ge in the range from 1 weight % to 6 weight %, In in the range from 2 weight % to 6 weight %, and Sb in the range from 2.2 times to 3.0 times of Te; in case of using the AgPdCu alloy material to form the reflection film, it contains Pd in the range from 0.9 weight % to 1.5 weight % and Cu in the range from 0.9 weight % to 1.1 weight %; in case of using the AlCu alloy material to form the reflection film, it contains Cu not more than 1.5 weight %; depth of each groove of the groove tracks on the major surface of the substrate is in the range from 40 nm to 50 nm; distance between two boundaries, among boundaries between lands and grooves of the groove tracks, is in the range from 0.40 µm to 0.65 µm; thickness of the first dielectric film is in the range from 75 nm to 95 nm; thickness of the phase change versatile recording film is in the range from 12 nm to 18 nm; thickness of the second dielectric film is in the range from 20 nm to 28 nm, and thickness of the reflection film is in the range from 60 nm to 140 nm. This configuration can prevent deterioration of jitters and a decrease of the modulation even when the linear velocity is increased upon recording and/or erasing information signals, and thereby ensures sufficient recording characteristics in the optical recording medium.

DETAILED DESCRIPTION OF THE PREFERRED EMBODIMENTS

Figure 1:
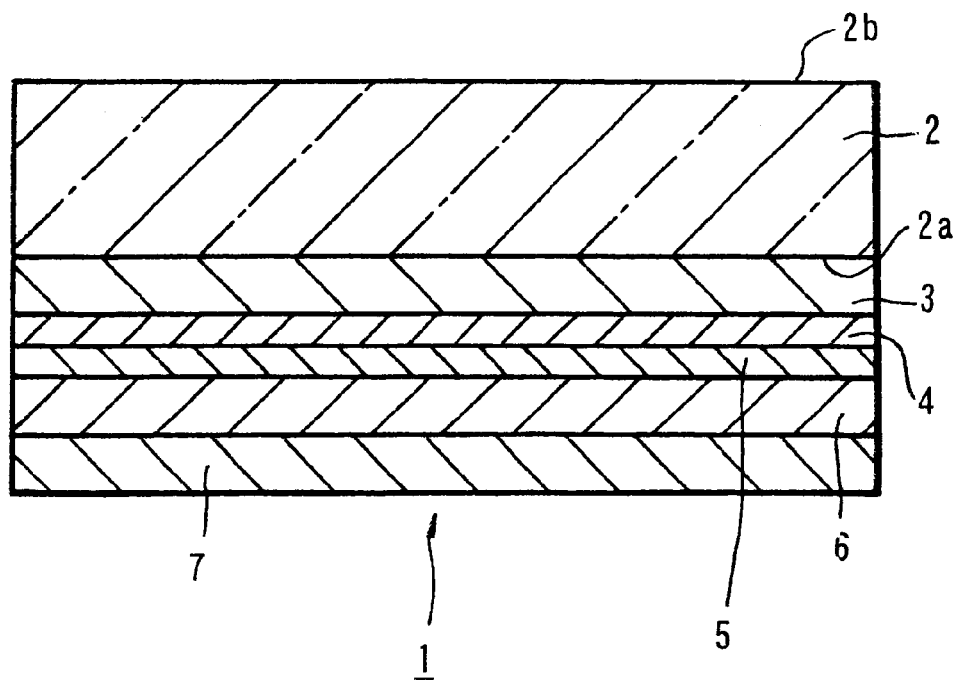
FIG. 1 is a cross-sectional view that shows an optical disc according to the first embodiment of the invention.

Embodiments of the invention are explained below with reference to the drawings. In all figures illustrating the embodiments, common and equivalent components are labeled with common reference numerals.

First explained is an optical recording medium according to the first embodiment of the invention. FIG. 1 shows the optical recording medium according to the first embodiment.

As shown in FIG. 1, the optical recording medium according to the first embodiment is a phase change versatile disc-shaped recording medium (hereafter called optical disc). The optical disc 1 is made up of a first dielectric film 3, phase change versatile recording film 4, second dielectric film 5, reflection film 6 and protective film 7 that are sequentially stacked on a major surface 2a of the disc substrate 2.

Figure 2:
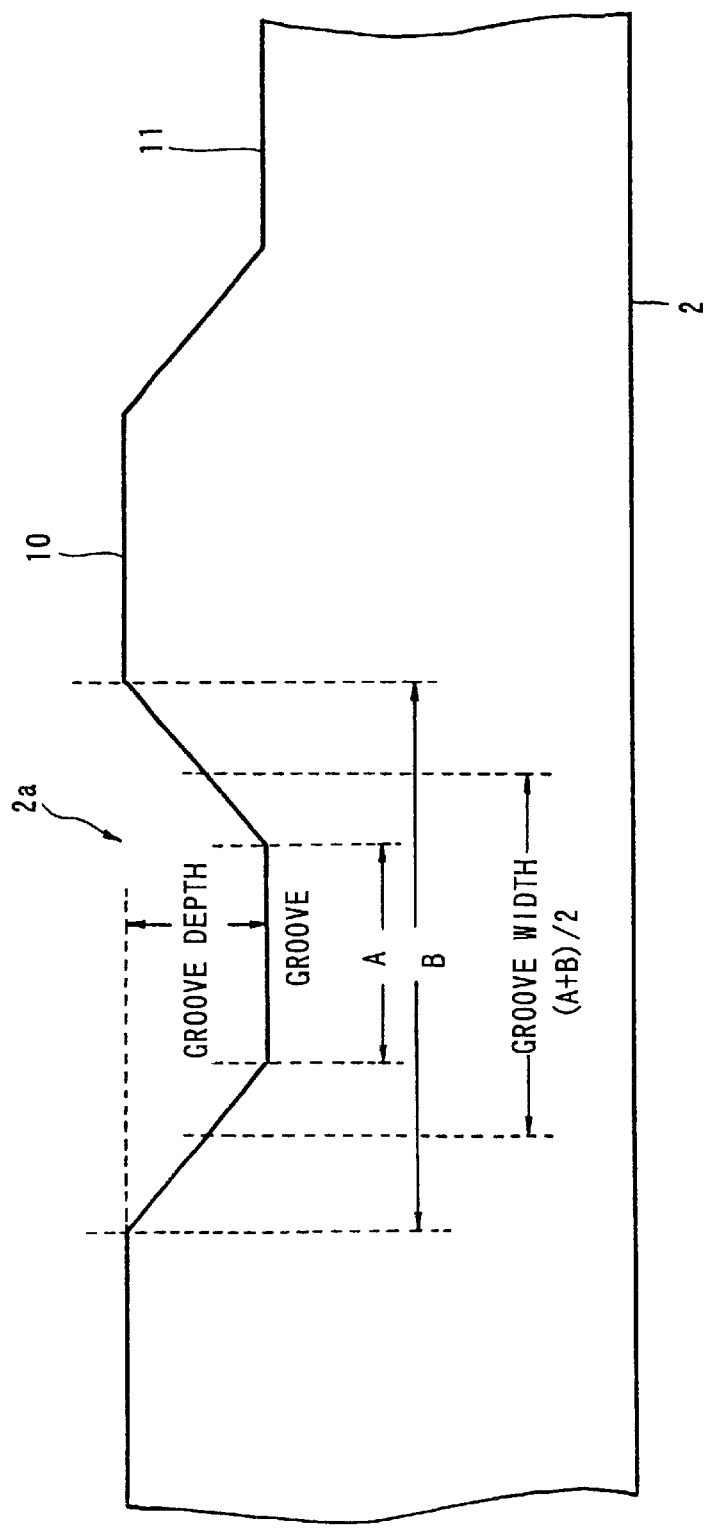
FIG. 2 is a cross-sectional view of a disc substrate for explaining width and depth of a groove according to the first embodiment of the invention.

The disc substrate 2 is made of a plastic material such as polycarbonate resin, polyolefin resin, acrylic resin, or the like, or glass. Material of the disc substrate is selected from those that can pass at least laser light used for recording and reproducing information signals, and from the viewpoint of its cost, a plastic material is preferably used. Thickness of the disc substrate 2 is about 1.2 mm, for example. In the first embodiment shown here, the major surface 2a of the disc substrate 2 has formed groove tracks as shown in FIG. 2, in which lands 10 and grooves 11 are alternately arranged in form of tracks. The track pitch is 1.6 µm, for example. Depth and width of the groove are selected, taking it into consideration that they largely affect push-pull (PP) signals; as servo signals, and radial contrast (RC) signals. Specifically, groove depth is selected from the range of 40 to 50 mm, and the groove width is selected from the range of 0.40 to 0.65

μm, and more preferably from the range of 0.52 to 0.65 μm. With these values of the groove depth and groove width, a value of 0.08 to 0.12 is obtained as the push-pull magnitude, and a value in the range from 0.3 to 0.6% is obtained as the post-recording RC. The above-indicated groove width is defined by the width between two boundaries that are adjacent at opposite sides of a groove among boundaries of lands 10 and grooves 11. Specifically, the width from the midpoint on the bank between a land 10 and a groove 11 to the midpoint on the opposed bank between the adjacent land 10 and the same groove 11, that is, the value (A+B)/2 calculated from the width A of the bottom of the groove 11 and the distance B between adjacent two lands, is defined as the groove width. Conditions of the groove depth and groove width will be explained later in greater detail.

The groove tracks as shown in FIG. 2 have formed corrugated wobbling (not shown) for reading an address upon recording/reproducing information. Wobbling amplitude at 0-peak in the wobbling is chosen from the viewpoint of obtaining a sufficient wobble signal and preventing deterioration of the recording signal characteristics. That is, if the wobbling amplitude is determined to be less than 30 nm, sufficient wobble signal will not be obtained. If the wobbling amplitude is determined to be more than 40 nm, it will cause deterioration of recording signal characteristics in optical discs having the track pitch of 1.6 μm. Therefore, the wobbling amplitude of the disc substrate 2 is chosen from the range of 30 to 40 nm. Details about conditions of the wobbling amplitude will be explained later.

Materials of the first dielectric film 3 and the second dielectric film 5 are preferably those having a low absorptance to laser light for recording and reproduction. They are preferably made of a material with an extinction coefficient k not larger than 0.3. Taking heat resistance into consideration, ZnS—SiO$_2$ (especially having a molar ratio around 4:1), for example, is recommended. These first dielectric film 3 and second dielectric film 5 may be made of different ones of such materials.

Thickness of the first dielectric film 3 is determined from viewpoints of its reflectance and modulation. That is, if thickness of the first dielectric film 3 is out of the range from 75 nm to 95 nm, its reflectance will increase, and the modulation will decrease. Therefore, it is determined in the range from 75 to 95 nm, and in the first embodiment, it is 85 nm, for example. Details about conditions of thickness of the first dielectric film 3 will be explained later.

Regarding the second dielectric film 5, if its thickness is less than 20 nm, the phase change versatile recording film 4 will be cooled rapidly, and the asymmetry property will deteriorate. On the other hand, if thickness of the second dielectric film 5 is thicker than 28 nm, its jitter characteristics will deteriorate, and desired property will not be obtained. Therefore, thickness of the second dielectric film 5 is preferably in the range from 20 nm to 28 nm. In the first embodiment, it is 24 nm, for example. Details about condition of the thickness of the second dielectric film 5 will be explained later.

The phase change versatile film 4 is made of a GeInSbTe alloy, for example. Among compositions of the GeInSbTe alloy forming the phase change versatile recording film 4, first regarding the content of Ge, if it is less than 1 weight %, storage stability will decrease. If its amount is more than 6 weight %, signal characteristics, especially the jitter characteristics, will decrease. Regarding the content of In, if it is less than 2 weight %, the phase change versatile recording film 4 will be difficult to crystallize. If it is more than 6 weight %, reproduction stability will decrease, such as undesirable disappearance of recorded marks. Regarding the ratio of Sb relative to Te, if the value of Sb/Te is less than 2.2, signal characteristics will deteriorate in high-speed ranges of linear velocity. If it is more than 3.0, signal characteristics will deteriorate in low-speed ranges of linear velocity. Therefore, in the GeInSbTe alloy forming the phase change versatile recording film 4, content of Ge is controlled in the range of 1 to 6 weight %, content of In is controlled in the range of 2 to 6 weight %, and Sb-to-Te ratio (Sb/Te) is controlled in the range of 2.2 through 3.0. In summary of these contents, when the composition of the phase change versatile recording film 4 is Ge$_p$In$_q$Sb$_r$Te$_s$, composition ratios p, q, r and s (weight %) simultaneously satisfy the relations of $1 \leq p \leq 6$, $2 \leq q \leq 6$ and $2.2 \leq r/s \leq 3.0$. Details about composition conditions of materials forming the phase change versatile recording film 4 will be explained later.

If the phase change versatile recording film 4 is thinner than 12 nm, it will not only make it difficult to obtain sufficient reflectance, but also invite deterioration of repetitive recording characteristics. If its thickness is larger than 18 nm, modulation will seriously decrease too small to obtain desired characteristics. Therefore, thickness of the phase change versatile recording film 4 is controlled in the range from 12 through 18 nm. In the first embodiment, it is 16 nm, for example.

The reflection film 6 is made of an Ag alloy, for example, and in the first embodiment, it may be made of an AgPdCu alloy. In the AgPdCu alloy forming the reflection film 6, first regarding the content of Pd, if it is higher than 1.5 weight % or lower than 0.9 weight %, resistance to corrosion will deteriorate. Also regarding the content of Cu, if it is less than 0.9 weight % or more than 1.1 weight %, resistance to corrosion will decrease. Therefore, in the AgPdCu alloy forming the reflection film 6 in the first embodiment, content of Pd is controlled in the range from 0.9 to 1.5 weight %, and content of Cu is controlled in the range of 0.9 to 1.1 weight %. Details about composition of materials forming the reflection film 6 will be explained later.

As to the reflection film 6, if its thickness is thinner than 60 nm, heat generated in the phase change versatile recording film 4 will not be able to diffuse sufficiently, and insufficient cooling will deteriorate the jitter characteristics. On the other hand, if the reflection film 6 is thicker than 140 nm; although not affecting thermal characteristics and optical characteristics, it adversely affects mechanical characteristics such as skew, and disables obtaining desired characteristics. Therefore, thickness of the reflection film 6 is chosen from the range of 60 to 140 nm, and in the first embodiment, it may be 120 nm, for example.

The protective film 7 is made of an ultraviolet-setting resin, for example.

Figure 4:
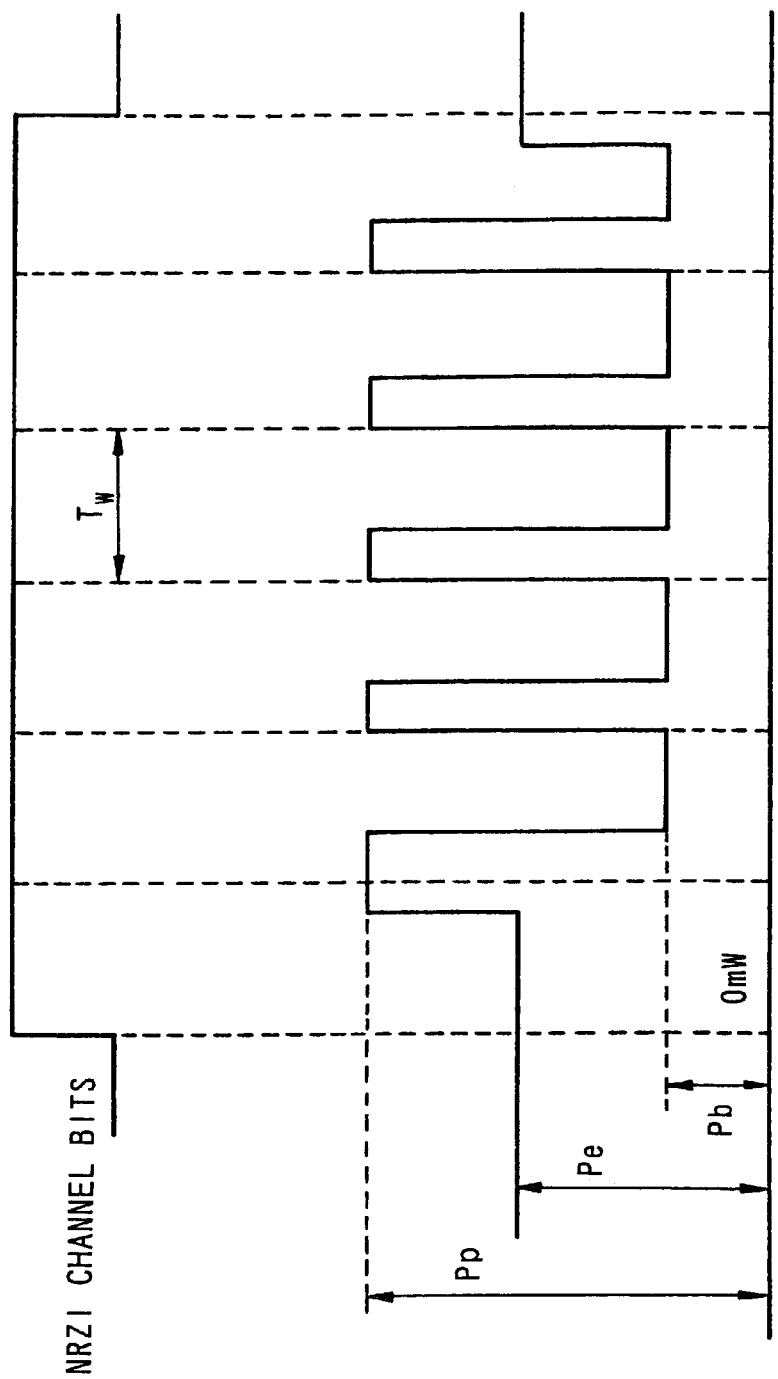
FIG. 4 is a graph that shows a recording light emission pattern used upon evaluating jitter characteristics of the optical disc according to the first embodiment of the invention.

For recording information signals on the optical disc 1 according to the first embodiment having the above-explained structure, recording light such as laser light having a wavelength around 780 nm, for example, is locally irradiated from the other major surface 2b opposite from the major surface 2a of the disc substrate 2 shown in FIG. 1 to change apart of the phase change versatile recording film 4 to a crystalline phase or amorphous phase. The phase change versatile material made of GeInSbTe according to the first embodiment changes to an amorphous state when cooled rapidly after heating, and changes to a crystalline state when cooled gradually, for example, although depending upon the heating temperature. In this way, by making a crystal portion and an amorphous portion in the phase change versatile recording film 4 in response to information signals, recording of the information signal is carried out. Recording bit length of the optical disc 1 according to the first embodiment is around 0.59 μm per bit, for example. Wavelength of the laser light used upon recording is chosen from the range of 775 to 795 nm, and more specifically, it is about 780 nm, for example. Numerical aperture NA is chosen from the range of 0.49 to 0.51, and more specifically, it is about 0.5, for example. For recording in the first embodiment, the recording waveform shown in FIG. 4 is used.

For reproducing information signals recorded on the optical disc 1, reproduction light such as laser light is irradiated toward the phase change versatile recording film 4 from the side of the other major surface 2b opposite from the major surface 2a of the disc substrate 2, thereby to carry out reproduction of information signals corresponding to the crystal phases and amorphous phases by using a difference in reflectance between different crystal phases or amorphous phases in the phase change versatile recording film 4. Used as the reproduction light is laser light not to cause a phase change in the phase change versatile recording film 4. Numerical aperture NA of the lens in the optical system used for reproduction is chosen from the range of 0.44 to 0.46, and more specifically, it is about 0.45, for example.

Next explained is a manufacturing method of the optical recording medium according to the first embodiment, namely, the optical disc 1.

In the optical disc manufacturing method according to the first embodiment, first prepared is the disc substrate 2 having a thickness around 1.2 mm and made of a material permitting at least laser light to pass through, such as polycarbonate resin, polyolefin resin, acrylic resin or glass. Thereafter, tracking groove 11 is made in a spiral form.

After that, on the major surface 2a of the disc substrate 2 having formed the groove 11, ZnS—SiO$_2$ is stacked by sputtering, for example, to form the first dielectric film 3 of ZnS—SiO$_2$.

Thereafter, a GeInSbTe alloy is stacked as a phase change versatile material on the first dielectric film 3 by sputtering, for example, to form the phase change versatile recording film 4. At that time, in the step of making the phase change versatile recording film by sputtering, a Ge$_p$In$_q$Sb$_r$Te$_s$ material is used as a target to satisfy the relations of $1 \leq p \leq 6$, $2 \leq q \leq 6$ and $2.2 \leq r/s \leq 3.0$. As this sputtering, simultaneous sputtering may be done by using a target of Ge, target of In, target of Sb and target of Te, or vacuum evaporation is also usable. By controlling the composition of those sputtering targets, phase-changing speed of the phase change versatile recording film 4 can be increased, and the recording characteristics of the optical disc 1 at high linear velocities can be enhanced.

After that, ZnS—SiO$_2$, for example, is stacked on the second dielectric film 4 by sputtering, for example, to form the second dielectric film 5.

Subsequently, the AgPdCu alloy is stacked on the second dielectric film 5 by sputtering, for example, to form the reflective film 6 made of an AgPdCu alloy. In the step of forming the reflective film 6 by sputtering, an AgPdCu alloy is used as a target, and composition ratios m and n (weight %) in the Ag$_t$Pd$_m$Cu$_n$ material are controlled to satisfy the relations of $0.9 \leq m \leq 1.5$ and $0.9 \leq n1.1$. As this sputtering, simultaneous sputtering may be employed by using a target of Ag, target of Pd and target of Cu simultaneously, or vacuum evaporation is also usable.

Finally coated is an ultraviolet-setting resin, for example, on the reflective film 6 by spin coating, for example. As a result, the protective film 7 for protecting films of the disc substrate 2 is formed on the reflective film 6.

In this way, the optical disc 1 according to the first embodiment is obtained.

Experiments were carried out concerning optical discs according to the first embodiment, together with experiments about optical discs out of conditions of those according to the first embodiment.

First made was the first experiment regarding relations between groove conditions including groove depth, groove width and wobbling amplitude and NWS (Normalized Wobble Signal), PP (Push-Pull magnitude) and RC (Radial Contrast).

That is, in the first experiment, disc substrates different in groove condition were prepared, and a first dielectric film, phase change versatile recording film, second dielectric film and reflective film were sequentially stacked in the same manufacturing process as that of the first embodiment on one major surface of each disc substrate having formed grooves. Then, after initialization or formatting, NWS, PP and RC were measured. At the same time, recording was carried out under optimized recording strategy and recording power, and PP and RC after recording were measured. Wavelength of the laser light in a measurement/evaluation apparatus used for the first experiment was 780 nm, and NA was 0.5. Recording density of the optical disc was 0.59 μm per bit.

Results of the first experiment are shown in Table 1 below. Ranges of numerical values indicated under the items, NWS, PP and RC, are their standard ranges. In the items of PP and RC, standard values before and after recording are shown together. When each evaluation result about NWS, PP and RC is in the standard range, "○" is indicated, and if it is out of the standard range, "X" is indicated.

TABLE 1

| Groove depth (nm) | Groove width (μm) | Wobbling amplitude (nm) | NWS 0.035–0.06 | PP 0.08–0.12 | CTS before >0.05 after 0.3–0.6 |
|---|---|---|---|---|---|
| 45 | 0.35 | 35 | ○ | X | X |
| 45 | 0.40 | 35 | ○ | ○ | ○ |
| 45 | 0.52 | 35 | ○ | ○ | ○ |
| 45 | 0.65 | 35 | ○ | ○ | ○ |
| 35 | 0.55 | 35 | ○ | X | ○ |
| 40 | 0.55 | 35 | ○ | ○ | ○ |
| 45 | 0.55 | 35 | ○ | ○ | ○ |
| 50 | 0.55 | 30 | ○ | ○ | ○ |
| 55 | 0.55 | 30 | ○ | ○ | X |
| 45 | 0.55 | 25 | X | ○ | ○ |
| 45 | 0.55 | 30 | ○ | ○ | ○ |
| 45 | 0.55 | 40 | ○ | ○ | ○ |

As apparent from Table 1, when the groove width is optimized to 0.55 μm, and the groove depth is changed variously in the range from 35 to 55 nm, PP comes out of the standard range when the groove depth is 35 nm or less, and RC comes out of the standard range when the groove depth is 55 nm or more. When the groove depth is 40 nm, 45 nm and 50 nm (40 to 50 nm), NWS, PP and RC before and after recording come within the standard ranges. Therefore, groove depth should be selected from the range larger than 35 nm and smaller than 55 nm, and more preferably from the range of 40 to 50 nm.

Still referring to Table 1, also when the groove depth is optimized to 45 nm, and the groove width is changed variously in the range of 0.35 to 0.65 µm, PP and RC before and after recording come out of the standard ranges when the groove width is 0.35 µm below 0.40 µm. In the case where the groove width is optimized to 45nm, and the groove width is changed to 0.40 µm, 0.52 µm, 0.55 µm and 0.65 µm, all of NWS, PP and RC before and after recording come within the standard ranges. Therefore, the groove width is preferably selected from the range of 0.40 to 0.65 µm, and more preferably from the range of 0.52 to 0.65 µm.

thickness. Ranges of numerical values indicated under the items are their standard ranges. That is, $I_{top}$ in the range of 15 through 25%, modulation in the range of 55 to 70%, resolution in the range of 45 to 60%, asymmetry in the range of −15 to 5%, and 3T jitters not higher than 15% are within the standard ranges. When each evaluation result of $I_{top}$, modulation, resolution, asymmetry and 3T jitters falls within the standard range, "○" is indicated, and if it is out of the standard range, "X" is indicated.

TABLE 2

| 1st dielectric film | Phase-versatile recording film | 2nd dielectric film | Reflective film | $I_{1top}$ 0.15~0.25 | Modulation 0.55~0.70 | Resolution 0.45~0.60 | Asymmetry −0.15~0.05 | 3T Jitter <15% |
|---|---|---|---|---|---|---|---|---|
| 65  | 16 | 24 | 120 | X | ○ | ○ | ○ | ○ |
| 75  | 16 | 24 | 120 | ○ | ○ | ○ | ○ | ○ |
| 95  | 16 | 24 | 120 | ○ | ○ | ○ | ○ | ○ |
| 105 | 16 | 24 | 120 | ○ | X | ○ | ○ | X |
| 80  | 10 | 24 | 120 | X | X | ○ | X | X |
| 80  | 12 | 24 | 120 | ○ | ○ | ○ | ○ | ○ |
| 80  | 18 | 24 | 120 | ○ | ○ | ○ | ○ | ○ |
| 80  | 21 | 24 | 120 | ○ | ○ | ○ | ○ | X |
| 85  | 16 | 18 | 120 | ○ | X | ○ | ○ | ○ |
| 85  | 16 | 20 | 120 | ○ | ○ | ○ | ○ | ○ |
| 85  | 16 | 28 | 120 | ○ | ○ | ○ | ○ | ○ |
| 85  | 16 | 30 | 120 | ○ | X | ○ | X | X |
| 85  | 16 | 24 | 40  | ○ | X | ○ | ○ | X |
| 85  | 16 | 24 | 60  | ○ | ○ | ○ | ○ | ○ |
| 85  | 16 | 24 | 140 | ○ | ○ | ○ | ○ | ○ |

Still referring to Table 1, when the groove depth and the groove width are optimized to 45 nm and 0.55 µm, respectively, and wobbling amplitude is changed variously in the range of 25 to 40 nm, NWS comes out of the standard range when the wobbling amplitude becomes 25 nm, below 30 nm. When the wobbling amplitude is 30 nm, 35 nm and 40 nm, all of NWS, PP and RC before and after recording come within the standard ranges. Therefore, wobbling amplitude should be at least larger than 25 nm, and more preferably selected from the range of 30 to 40 nm.

Next made was the second experiment regarding dependencies of signal characteristics of optical discs upon film thickness of the first dielectric film, phase change versatile recording film, second dielectric film and reflective film.

That is, in the second experiment, the first dielectric film, phase change versatile recording film, second dielectric film and reflective film were formed on each disc substrate, variously changing these films in thickness to obtain optical discs. After that, recording characteristics of these various optical discs were evaluated. In the second experiment, evaluation was made at two kinds of linear velocities for recording, namely, 4.8 m/s (four-times velocity) and 12 m/s (ten-times velocity). The measurement/evaluation apparatus and recording densities of optical discs used in the second experiment were the same as those of the first experiment, and the recording strategy and the recording power were optimized.

Figure 3:
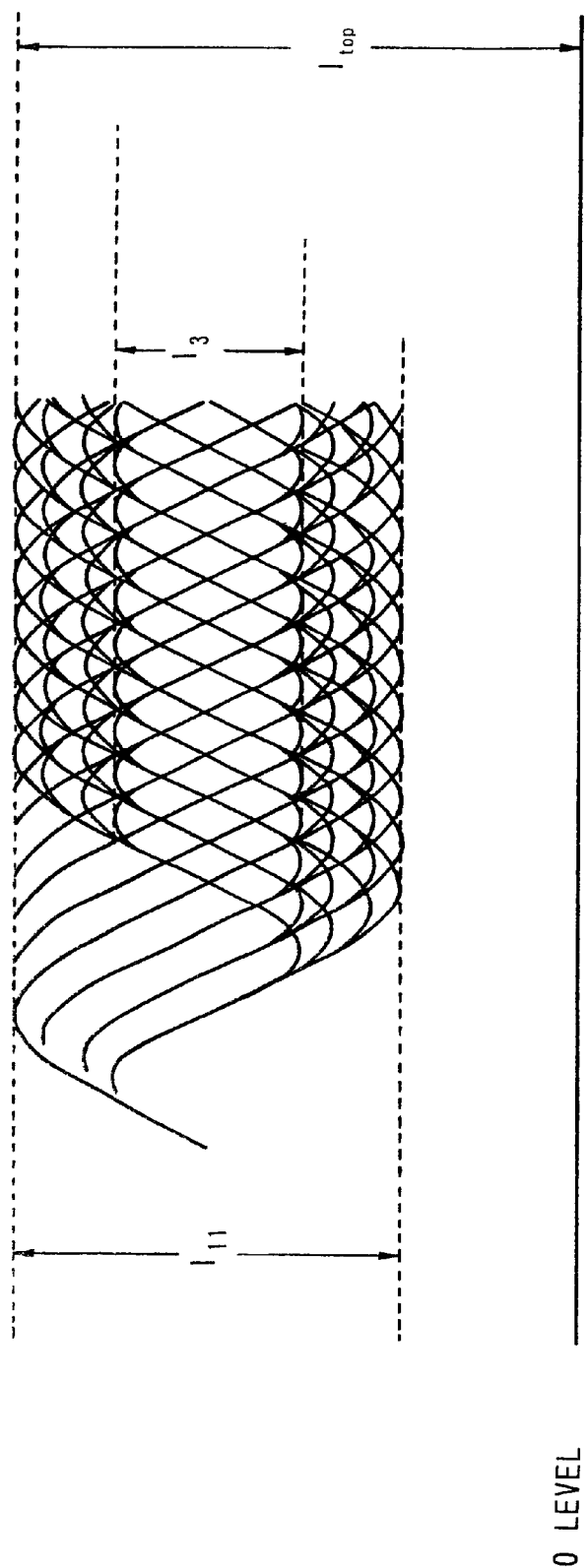
FIG. 3 is a graph for explaining definitions of characteristics regarding reflectance evaluated in the first embodiment of the invention.

Results of the second experiment are shown in Table 2 below. In the second experiment, $I_{top}$ (higher reflectance level of 11T signals recorded in the groove. See FIG. 3), modulation ($I_{11}/I_{top}$. See FIG. 3), resolution ($I_3/I_{top}$. See FIG. 3), asymmetry ((the center of $I_3$—the center of $I_{11}$)/$I_{11}$. See FIG. 3), and 3T jitter characteristics were measured while variously changing the films forming optical discs in As apparent from Table 2, in case that thickness of the first dielectric film is changed variously in the range from 65 to 105 nm while optimizing thickness of the other films, when the thickness is 65 nm below 75 nm, $I_{top}$ comes out of the standard range, and when the thickness is 105 nm beyond 95 nm, all items other than $I_{14h}$ come out of the standard ranges. When thickness of the first dielectric film is 75 nm, 80 nm, 85 nm and 90 nm (75 to 90 nm), all characteristics come within the standard ranges. Therefore, thickness of the first dielectric film should be chosen from the range larger than 65 nm and less than 105 nm, and more preferably from the range of 75 to 95 nm.

Still referring to Table 2, when thickness of the phase change versatile recording film is changed variously in the range of 10 to 21 nm while the first dielectric film is optimized to 80 nm or 85 nm, all items other than resolution come out of the standard ranges when the thickness is 10 nm below 12 nm. When thickness of the phase change versatile recording film is 21 nm, 3T jitters come out of the standard range. When thickness of the first dielectric film is optimized to 80 nm and thickness of the phase change versatile recording film is changed to 12 nm and 18 nm, all items come within the standard ranges. Therefore, thickness of the phase change versatile recording film should be selected from the range larger than 10 nm and smaller than 21 nm, and more preferably from the range of 12 to 18 nm.

Still referring to Table 2, in case that the first dielectric film and the phase change versatile recording film are optimized in thickness to 85 nm and 16 nm, respectively, and thickness of the second dielectric film is changed variously in the range of 18 to 30 nm, when the thickness of the second dielectric film is 18 nm below 20 nm, modulation comes out of the standard range. When thickness of he second dielectric film is 30 nm, modulation, asymmetry and 3T jitter come out of the standard ranges. When thickness of the second dielectric film is changed to 20 nm, 24 nm and 28 nm, all items come within the standard ranges. Therefore, thickness of he second dielectric film should be selected from the range larger than 18 nm and smaller than 30 nm, and more preferably from the range of 20 to 28 nm.

Still referring to Table 2, in case that the first dielectric film, phase change versatile recording film and second dielectric film are optimized in thickness to 85 nm, 16 nm and 24 nm, respectively, and thickness of the reflective film is changed variously in the range of 40 to 140 nm, when thickness of the reflective film is 40 nm below 60 nm, modulation and 3T jitter come out of the standard ranges. When thickness of the reflective film is 60 nm and 140 nm, all items come within the standard ranges. Therefore, thickness of the reflective film should be larger than 40 nm, and preferably selected from the range of 60 to 140 nm.

Next made was the third experiment regarding dependencies of signal characteristics of optical discs upon compositions of materials forming the phase change versatile recording film.

In the third experiment, the first dielectric film, phase change versatile film, second dielectric film and reflective are formed on each disc substrate, changing compositions of the phase change versatile recording films variously, to make up optical discs. After that, under two kinds of linear velocities for recording, namely, 4.8 m/s (four-times velocity) and 12 m/s (ten-times velocity), jitter characteristics were evaluated with these various optical discs. For both those two kinds of linear velocities, only when jitter characteristics were evaluated to be good, optical discs after recording were held for 100 hours in an atmosphere held at the temperature of 80° C. and humidity of 85%, and evaluation was carried out thereafter to confirm whether reproduction characteristics of these optical discs deteriorated, that is, whether they were acceptable in storage stability. The measurement/evaluation apparatus and recording densities of optical discs used in the third experiment were the same as those of the first experiment, and the recording strategy and the recording power were optimized.

Results of the third experiment are shown in Table 3 below. In the third experiment, measurement was carried out with various optical discs different in composition of the phase change versatile recording films. The range of numerical values under the item of jitter indicates the standard range. That is, jitters of 15% or less are within the standard range. When each evaluation result about jitters falls within the standard range, that is, in the range not higher than 15%, "○" is indicated, and if it is out of the standard range, i.e. in excess of 15%, "X" is indicated. Regarding storage stability, when it deteriorates, "X" is indicated, and when no deterioration or changes occurs, "○" is indicated.

TABLE 3

| Ge weight % | In weight % | Sb/Te – | Jitter 4x <15% | Jitter 10x <15% | Storage stability |
|---|---|---|---|---|---|
| 0 | 3 | 2.4 | ○ | ○ | X |
| 1 | 3 | 2.4 | ○ | ○ | ○ |
| 6 | 3 | 2.6 | ○ | ○ | ○ |
| 7 | 3 | 2.6 | X | X | — |
| 2 | 0 | 2.4 | X | X | — |
| 2 | 2 | 2.4 | ○ | ○ | ○ |
| 4 | 6 | 2.6 | ○ | ○ | ○ |
| 4 | 8 | 2.6 | X | ○ | — |
| 2 | 4 | 2 | ○ | X | — |
| 2 | 4 | 2.2 | ○ | ○ | ○ |
| 4 | 4 | 2.8 | ○ | ○ | ○ |

TABLE 3-continued

| Ge weight % | In weight % | Sb/Te – | Jitter 4x <15% | Jitter 10x <15% | Storage stability |
|---|---|---|---|---|---|
| 4 | 4 | 3.0 | ○ | ○ | ○ |
| 4 | 4 | 3.2 | X | ○ | — |

As apparent from Table 3, while the content (composition ratio) of Ge is changed variously in the range of 0 to 7 weight %, when the composition ratio of Ge is 0 weight %, storage stability is bad, and optical discs deteriorate. When the composition ratio of Ge is 7 weight % beyond 6 weight %, under any of the linear velocities, namely ten-times velocity and four-times velocity, jitter comes out of the standard range. When the composition ratio of Ge is changed to 1 weight %, 2 weight %, 4 weight % and 6 weight %, as far as the other composition ratios are optimized, all characteristics come within the standard ranges. Therefore, composition ratio of Ge should be selected from the range larger than 0 weight % and smaller than 7 weight %, and more preferably from the range of 1 to 6 weight %.

Still referring to Table 3, when the composition ratio is optimized to 2 weight % or 4 weight %, and composition ratio of In is changed variously in the range of 0 to 8 weight %, jitter comes out of the standard range under any of the linear velocities, ten-times velocity and four-times velocity, when the composition ration of In is 0 weight %. When the composition ration of In is 8 weight % beyond 6 weight %, jitter at the four-times linear velocity comes out of the standard range. In the case where the composition ratio of Ge is optimized to 2 weight % or 4 weight %, and composition ratio of In is changed to 2 weight %, 3 weight %, 4 weight % and 6 weight %, respectively, all items come within the standard ranges. Therefore, composition ratio of In should be selected from the range larger than 0 weight % and smaller than 8 weight %, and more preferably from the range of 2 to 6 weight %.

Still referring to Table 3, in case that composition ratios of Ge and In are optimized to 2 weight % (or 4 weight %) and 4 weight %, and the ratio of Sb/Te is changed variously in the range of 2 to 3.2, when the Sb/Te ratio is 2 below 2.2, jitter at the ten-times linear velocity comes out of the standard range. When the Sb/Te ratio is 3.2 beyond 3.0, jitter at the four-times linear velocity comes out of the standard range. In the case where composition ratios of Ge and In are optimized and the Sb/Te ratio is set to 2.2, 2.8 and 3.0, evaluated values of all items come within the standard ranges. Therefore, Sb/Te ratio should be selected from the range larger than 2 and smaller than 3.2, and more preferably from the range of 2.2 to 3.0. and more preferably from the range of 2.2 to 2.8.

Next made was the fourth experiment about dependencies of resistance to corrosion and signal characteristics of optical discs upon composition of the reflective film.

In the fourth experiment, the first dielectric film, phase change versatile recording film and second dielectric film were formed on each disc substrate. After that, reflective films with various composition ratios were stacked on the second dielectric films, thereby to obtain optical discs. Thereafter, jitter characteristics were evaluated with these various optical discs under the recording linear velocity of 4.8 m/s (four-times velocity). Additionally, these optical discs were stored for 100 hours in an atmosphere at the temperature of 80° C. and the humidity of 85%, and evaluation was carried out to confirm whether any corrosion occurred on surfaces of the reflective films, i.e., whether resistance to corrosion is good or not. The measurement/evaluation apparatus and recording densities of optical discs used in the fourth experiment were the same as those of the first experiment, and the recording strategy and the recording power were optimized.

Results of the fourth experiment are shown in Table 4 below. In the fourth experiment, optical discs variously changed in composition ratio of the AgPdCu alloy forming the reflective films were measured. The range of numerical values under the item of jitter indicates the standard range. That is, jitters of 15% or less are within the standard range. When each evaluation result about jitters falls within the standard range not higher than 15%, "○" is indicated, and if it is out of the standard range, i.e. in excess of 15%, "X" is indicated. Regarding resistance to corrosion, when there is corrosion, "X" is indicated, and when there is no corrosion, "○" is indicated.

TABLE 4

| Al weight % | Ag weight % | Pd weight % | Cu weight % | Anti-corrosion | Jitter (4X) <15% |
|---|---|---|---|---|---|
| — | 100 | — | — | X | ○ |
| — | balance | 0.5 | 1 | ○ | ○ |
| — | balance | 0.9 | 1 | ○ | ○ |
| — | balance | 1.5 | 1 | ○ | ○ |

As apparent from Table 4, only when the composition ratio of Ag is 100 weight %, corrosion occurs. Otherwise, whichever composition ratio the reflection film has, jitter comes within the standard range. That is, when Pd and Cu are added to Ag, corrosion does not occur, and resistance corrosion is enhanced. Therefore, the reflective film should be made of an AgPdCu alloy, preferably having the composition ratio of Pd in the range of 0.5 to 1.5 weight %, and preferably in the range of 0.9 to 1.5 weight %, and having the composition ratio of Cu in the range of 0.9 to 1.1 weight % near 1 weight %.

Next made was the fifth experiment about DOW (Direct Over Write) characteristics.

In the fifth experiment, similarly to the first embodiment, the 85 nm thick first dielectric film 3, 16 nm thick phase change versatile recording film 4, 24 nm thick second dielectric film 5 and 80 nm thick reflective film 6 were formed on each disc substrate 2 to make up optical discs 1. Then, information signals were recorded on the optical discs 1 at the linear velocity of 4.8 m/s (four-times velocity). Additionally, information signals were recorded on similar optical discs 1 at the linear velocity of 12 m/s (ten-times velocity). Furthermore, under these two linear velocities, overwrite was repeated, and jitter characteristics were evaluated. The measurement/evaluation apparatus and recording densities of optical discs used in the fifth experiment were the same as those of the first experiment, and the recording strategy and the recording power were optimized.

Figure 5A:
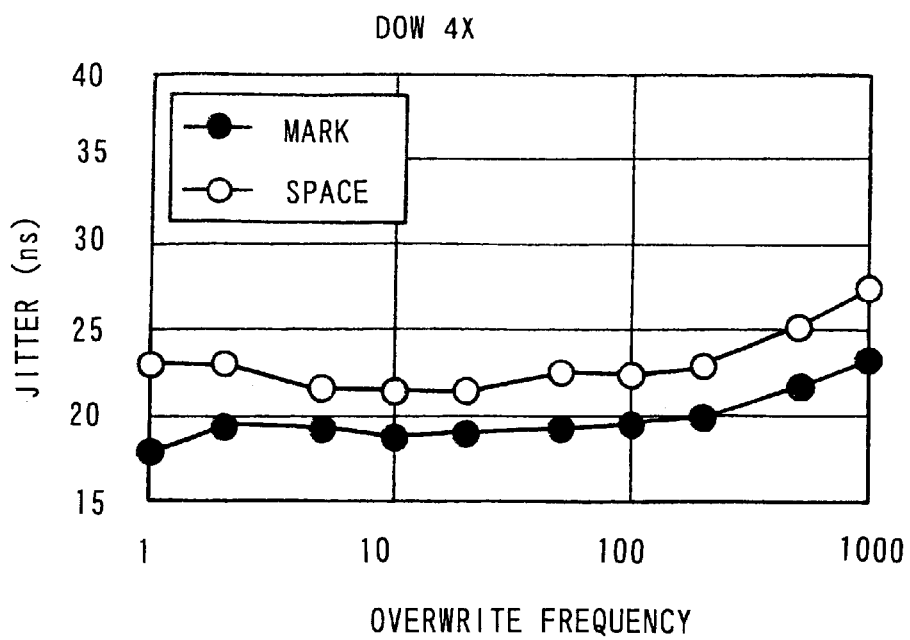
FIGS. 5A and 5B are graphs that show relations between frequency of overwrite and jitter of optical discs according to the first embodiment of the invention.
Figure 5B:
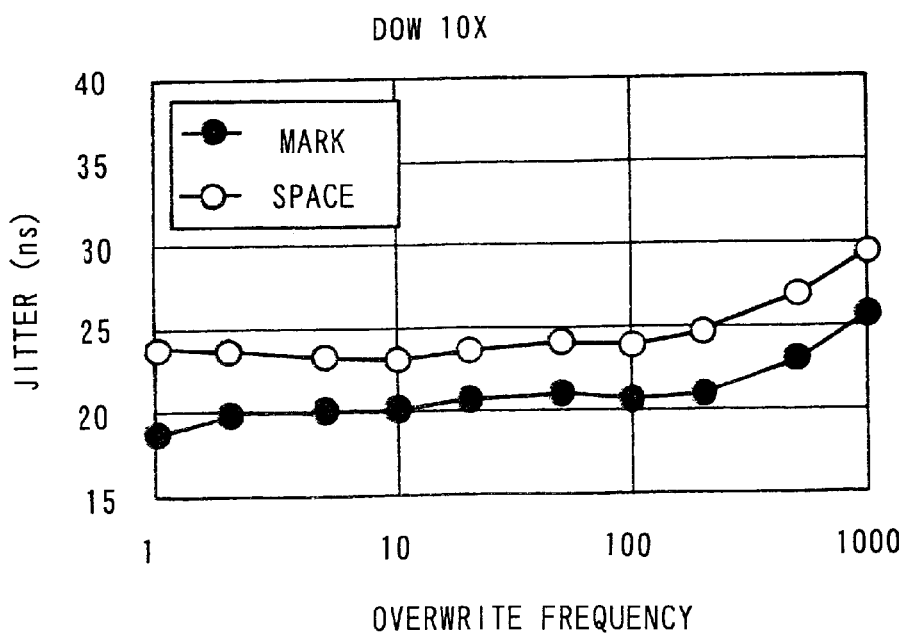

FIGS. 5A and 5B show results of the fifth experiment. FIG. 5A shows dependency of 3T jitter upon overwrite frequency at the linear velocity of 4.8 m/s whereas FIG. 5B shows dependency of 3T jitter upon overwrite frequency at the linear velocity of 12 m/s. In FIGS. 5A and 5B, 3T jitters of both marks and spaces are shown. The value of 35 ns on the jitter axis approximately corresponds to 15% of jitter (1T=231 ns and 35/1T≈0.15=15%).

As apparent from FIGS. 5A and 5B, at both linear velocities, 4.8 m/s and 12 m/s, it was confirmed that, when repetitive recording frequencies reached 1000 times, 3T jitter in marks was 25 ns (about 11%) or less, and 3T jitter in spaces was 30 ns (about 13%) or less, and therefore, sufficient recording characteristics could be obtained.

From these results, optical discs according to the first embodiment were confirmed to be able to record and reproduce information while maintaining sufficient recording characteristics at both linear velocities in the range from 4.8 m/s to 12 m/s.

As explained above, according to the first embodiment, the phase change versatile recording film 4 in the optical disc 1 is made of a GeInSbTe alloy material; the reflection film is made of an AgPdCu alloy material; the GeInSbTe alloy material forming the phase change versatile recording film 4 contains Ge in the range from 1 to 6 weight %, In in the range from 2 to 6 weight %, and Sb/Te ratio in the range from 2.4 to 3.0; the AgPdCu alloy material forming the reflective film 6 contains Pd in the range from 0.9 to 1.5 weight % and Cu in the range from 0.9 to 1.1 weight %; groove depth is in the range from 40 to 50 nm; groove width is in the range from 0.40 to 0.65 μm; thickness of the first dielectric film 3 is in the range from 75 to 95 nm; thickness of the phase change versatile recording film 4 is in the range from 12 to 18 nm; thickness of the second dielectric film 5 is in the range from 20 to 28 nm, and thickness of the reflection film 6 is in the range from 60 to 140 nm. Therefore, it is possible to perform recording and reproduction while maintaining characteristics of the standard of conventional phase change versatile optical discs (wavelength of laser light: 780 nm; capacity: 650 MB; track pitch: 1.6 μm, (during reproduction, NA: 0.45; reflectance: 15 to 25%; modulation: 55 to 70%; resolution: 45 to 60%); (during recording, NA: 0.5; repetitive recording frequency: 1000 times or more)) even when the linear velocity is 12 m/s not lower than 4.8 m/s. Therefore, sufficient recording power margin can be made.

Next explained is an optical disc according to the second embodiment. In the optical disc according to the second embodiment, unlike the first embodiment, the reflective film 6 is made of an AlCu alloy. Content of Cu in the AlCu alloy is controlled in the range not higher than 1.5 weight %, and more specifically, to 1 weight %, for example. The other configuration of the optical disc according to the second embodiment is the same as the first embodiment, and its explanation is omitted here.

Using the optical disc according to the second embodiment, the sixth experiment was conducted about resistance to corrosion of the reflective film and dependency of signal characteristics upon composition of the reflective film.

In the sixth experiment, similarly to the manufacturing method according to the first embodiment, the first dielectric film, phase change versatile recording film and second dielectric film were first formed on each disc substrate. Thereafter, reflective films made of AlCu alloys different in composition were stacked on the second dielectric films to make up optical discs. After that, with these various optical discs, jitter characteristics were evaluated at the recording linear velocity of 4.8 m/s (four-times velocity). Further, these optical discs were stored for 100 hours in an atmosphere controlled at the temperature of 80° C. and the humidity of 85%, evaluation was made to confirm whether erosion occurred on surfaces of the reflective films, that is, whether the optical discs were good in resistance to corrosion. The measurement/evaluation apparatus and recording densities of optical discs used in the sixth experiment were the same as those of the first experiment, and the recording strategy and the recording power were optimized.

Results of the sixth experiment are shown in Table 5 below. In the sixth experiment, measurement was conducted with optical discs changed variously in composition of the AlCu alloy forming the reflective films. The range of numerical values under the item of jitter indicates the standard range. That is, jitters of 15% or less are within the standard range. When each evaluation result about jitters falls within the standard range, that is, in the range not higher than 15%, "○" is indicated, and if it is out of the standard range, i.e. in excess of 15%, "X" is indicated. Regarding resistance to corrosion, when there is corrosion, "X" is indicated, and when there is no corrosion, "○" is indicated.

TABLE 5

| Al weight % | Ag weight % | Pd weight % | Cu weight % | Anti-corrosion | Jitter (4x) <15% |
|---|---|---|---|---|---|
| Balance | — | — | 1 | ○ | ○ |
| Balance | — | — | 1.5 | ○ | ○ |
| Balance | — | — | 2 | ○ | X |

As apparent from Table 5, when the content of Cu forming the reflective film is 2 weight %, jitter comes out of the standard range, and when the content is 1.5% and 1% below 2 weight %, jitter comes within the standard range. Further, regardless of the content of Cu, corrosion does not occur, and good resistance to corrosion is obtained. Therefore, the reflective film 6 according to the second embodiment has to be made of an AlCu alloy containing at least Cu in the range not higher than 2 weight %, and more preferably in the range not higher than 1.5 weight %.

The second embodiment, which is the same as the first embodiment except the reflective film 6 made of an AlCu alloy, ensures the same effects as those of the first embodiment.

Although the invention has been explained with reference to specific embodiments, the invention is not limited to these embodiments, but can be modified in various modes within the technical concept of the invention.

For example, film deposition methods and materials of disc substrates and protective films proposed in the foregoing embodiments are not but mere examples, and different film deposition methods or disc substrates or protective films made of other materials may be used, if necessary.

Although the first and second embodiments have been explained as using $ZnS$—$SiO_2$ as the material of the first dielectric film and the second dielectric film, any other material may be used provided the extinction coefficient k is not larger than 0.3. More specifically, usable as materials of the first dielectric film and the second dielectric film are materials made of, or containing as a major component, nitrides, oxides, carbides, fluorides, sulfides, nitric oxides, nitric carbides or oxycarbides of metals or semi-metals like Al, Si, Ta, Ti, Zr, Nb, Mg, B, Zn, Pb, Ca, La, Ge, and so on. More specifically, usable as materials of the first dielectric film 3 and the second dielectric film 5 are $AlN_x$ ($0.5 \leq x1$, especially AlN), $Al_2O_{3-x}$ ($0 \leq x \leq 1$ (especially $Al_2O_3$)), $Si_3N_{4-x}$ ($0 \leq x \leq 1$ (especially $Si_3N_4$)), $SiO_x$ ($1 \leq x \leq 2$ (especially $SiO_2$, SiO), MgO, $Y_2O_3$, $MgAl_2O_4$, $TiO_x$ ($1 \leq x \leq 2$, especially $TiO_2$)), $BaTiO_3$, $SrTiO_3$, $Ta_2O_{5-x}$ ($0 \leq x \leq 1$ (especially $Ta_2O_5$)), $GeO_x$ ($1 \leq x \leq 2$), SiC, ZnS, PbS, Ge—N, Ge—N—O, Si—N—O, $CaF_2$, LaF, $MgF_2$, NaF, $TiF_4$, and so on, or materials containing them as their major components, or mixtures of these materials, such as AlN—$SiO_2$, for example.

As explained above, according to the first aspect of the invention, the phase change versatile recording film is made of a GeInSbTe alloy material; the reflection film is made of an AgPdCu alloy material; the GeInSbTe alloy material forming the phase change versatile recording film contains Ge in the range from 1 weight % to 6 weight %, In in the range from 2 weight % to 6 weight %, and Sb in the range from 2.2 to 3.0 times of Te; the AgPdCu alloy material forming the reflective film contains Pd in the range from 0.9 weight % to 1.5 weight % and Cu in the range from 0.9 weight % to 1.1 weight %; groove depth in the groove track corrugation is in the range from 40 nm to 50 nm; distance between two boundaries, among boundaries between lands and grooves of the groove tracks, is in the range from 0.40 μm to 0.65 μm; thickness of the first dielectric film is in the range from 75 nm to 95 nm; thickness of the phase change versatile recording film is in the range from 12 nm to 18 nm; thickness of the second dielectric film is in the range from 20 nm to 28 nm, and thickness of the reflection film is in the range from 60 nm to 140 nm. Therefore, it is possible to ensure recording and reproduction characteristics based on the conventional standard, with NA during recording being 0.5 and NA during reproduction being 0.45, therefore enable reproduction in accordance with the conventional standard, prevent deterioration of jitter and decrease of modulation even at the linear velocity of 4.8 m/s through 12 m/s, obtain a sufficient recording power margin, and thereby obtain an optical recording medium ensuring practically sufficient recording/reproducing properties.

According to the second aspect of the invention, the phase change versatile recording film is made of a GeInSbTe alloy material; the reflection film is made of an AlCu alloy material; the GeInSbTe alloy material forming the phase change versatile recording film contains Ge in the range from 1 weight % to 6 weight %, In in the range from 2 weight % to 6 weight %, and Sb in the range from 2.2 to 3.0 times of Te; the AlCu alloy material forming the reflection film contains Cu not exceeding 1.5 weight %; groove depth in the groove track corrugation is in the range from 40 nm to 50 nm; distance between two boundaries, among boundaries between lands and grooves of the groove tracks, is in the range from 0.40 μm to 0.65 μm; thickness of the first dielectric film is in the range from 75 nm to 95 nm; thickness of the phase change versatile recording film is in the range from 12 to 18 nm; thickness of the second dielectric film is in the range from 20 nm to 28 nm, and thickness of the reflection film is in the range from 60 nm to 140 nm. Therefore, it is possible to ensure recording and reproduction characteristics based on the conventional standard, with NA during recording being 0.5 and NA during reproduction being 0.45, therefore enable reproduction with reproduction-exclusive apparatuses in accordance with the conventional standard, prevent deterioration of jitter and decrease of modulation even at the linear velocity of 4.8 m/s through 12 m/s, obtain a sufficient recording power margin, and thereby obtain an optical recording medium ensuring practically sufficient recording/reproducing properties.

What is claimed is:
1. An optical recording medium comprising:
   a substrate having ridge-and-furrow groove tracks on one major surface thereof; and
   a first dielectric film, phase change versatile recording film, second dielectric film and reflection film that are sequentially stacked on the one major surface of said substrate, said phase change versatile recording film being made of a GeInSbTe alloy material, and said reflection film being made of an AgPdCu alloy material, in said GeInSbTe alloy material forming said phase change versatile recording film, content of Ge being in the range from 1 weight % to 6 weight %, content of In being in the range from 2 weight % to 6 weight %, and ratio of Sb relative to Te being in the range of 2.2 times to 3.0 times, and in said AgPdCu alloy material forming said reflection film, content of Pd being in the range of 0.9 weight % to 1.5 weight %, and content of Cu being in the range of 0.9 weight % to 1.1 weight %, depth of the furrow on said groove tracks being in the range from 40 nm to 50 nm, and distance between two adjacent boundaries at opposite sides of said furrow being in the range of 0.40 μm to 0.65 μm, thickness of said first dielectric film being in the range of 75 nm to 95 nm, thickness of said phase change versatile recording film being in the range of 12 nm to 18 nm, thickness of said second dielectric film being in the range of 20 nm to 28 nm, and thickness of said reflection film being in-the range of 60 nm to 140 nm.

2. The optical recording medium according to claim 1 wherein wavelength of light irradiated onto said phase change versatile recording film on said optical recording medium upon execution of recording and/or erasure of information signal on or from said optical recording medium is in the range from 775 nm to 795 nm.

3. The optical recording medium according to claim 1 wherein numerical aperture of a lens of an optical system used upon recording and/or erasing information signals on or from the optical recording medium is in the range from 0.49 to 0.51, and numerical aperture of a lens of an optical system used for reproducing information signals is in the range from 0.44 to 0.46.

4. The optical recording medium according to claim 1 wherein recording linear density of said optical recording medium is approximately 0.59 μm per bit.

5. The optical recording medium according to claim 1 wherein, in said GeInSbTe alloy material forming said phase change versatile recording film, ratio of Sb relative to Te is in the range from 2.2 times to 2.8 times.

6. The optical recording medium according to claim 1 wherein said distance between two adjacent boundaries at opposite sides of said furrow is in the range from 0.52 μm to 0.65 μm.

7. An optical recording medium comprising:

a substrate having ridge-and-furrow groove tracks on one major surface thereof; and a first dielectric film, phase change versatile recording film, second dielectric film and reflection film that are sequentially stacked on said one major surface of said substrate, said phase change versatile recording film being made of a GeInSbTe alloy material, and said reflection film being made of an AlCu alloy material, in said GeInSbTe alloy material forming said phase change versatile recording film, content of Ge being in the range from 1 weight % to 6 weight %, content of In being in the range from 2 weight % to 6 weight %, and ratio of Sb relative to Te being in the range of 2.2 times to 3.0 times, and in said AlCu alloy material forming said reflection film, content of Cu being not more than 1.5 weight %, depth of the furrow on said groove tracks being in the range from 40 nm to 50 nm, and distance between two adjacent boundaries at opposite sides of said furrow being in the range of 0.40 μm to 0.65 μm, thickness of said first dielectric film being in the range of 75 nm to 95 nm, thickness of said phase change versatile recording film being in the range of 12 nm to 18 nm, thickness of said second dielectric film being in the range of 20 nm to 28 nm, and thickness of said reflection film being in the range of 60 nm to 140 nm.

8. The optical recording medium according to claim 7 wherein wavelength of light irradiated onto said phase change versatile recording film on said optical recording medium upon execution of recording and/or erasure of information signal on or from said optical recording medium is in the range from 775 nm to 795 nm.

9. The optical recording medium according to claim 7 wherein numerical aperture of a lens of an optical system used upon recording and/or erasing information signals on or from the optical recording medium is in the range from 0.49 to 0.51, and numerical aperture of a lens of an optical system used for reproducing information signals is in the range from 0.44 to 0.46.

10. The optical recording medium according to claim 7 wherein recording linear density of said optical recording medium is approximately 0.59 μm per bit.

11. The optical recording medium according to claim 7 wherein, in said GeInSbTe alloy material forming said phase change versatile recording film, ratio of Sb relative to Te is in the range from 2.2 times to 2.8 times.

12. The optical recording medium according to claim 7 wherein said distance between two adjacent boundaries at opposite sides of said furrow is in the range from 0.52 μm to 0.65 μm.

* * * * *